C. J. ADDY.

Machine for Burnishing the Edges of Boots and Shoes.

No. 8,246. Reissued May 21, 1878.

Witnesses.

W. J. Pratt.

L. A. Baxter

Inventor.

Charles J. Addy by Crosby & Gregory Attys.

N. PETERS, PHOTO-LITHOGRAPHER, WASHINGTON, D. C.

UNITED STATES PATENT OFFICE.

CHARLES J. ADDY, OF BOSTON, MASSACHUSETTS.

IMPROVEMENT IN MACHINES FOR BURNISHING THE EDGES OF BOOTS AND SHOES.

Specification forming part of Letters Patent No. 196,283, dated October 23, 1877; Reissue No. 8,246, dated May 21, 1878; application filed January 5, 1878.

*To all whom it may concern:*

Be it known that I, CHARLES J. ADDY, of Boston, in the county of Suffolk and State of Massachusetts, have invented a new and useful Improvement in Machines for Burnishing the Edges of Boots and Shoes, of which the following is a specification:

My invention relates to that class of edge-burnishing machines in which the burnishing-tool, driven by power and held in a tool-carrying frame, is guided by hand and applied to the edge of the boot or shoe supported on a jack.

The invention consists, primarily, in an organized machine to burnish the edges of boots and shoes, a tool-carrying frame, burnishing-tool, rotating shaft therein, driven continuously in one direction to reciprocate the burnishing-tool, a horizontally-movable supporting-frame, a rotating shaft therein driven continuously in one direction to rotate the shaft in the tool-carrying frame, and a universal joint between the tool-carrying and supporting frames, to permit free motion of the tool-carrying frame, substantially as hereinafter described.

With the mechanism just referred to is combined a shoe-holding jack, which has a motion of rotation about a fixed jack-supporting standard, whereas in most other machines such standard is made to be moved laterally with reference to the burnishing-tool; also, in combination with the tool-carrying frame, a loosely-connected weighted lever, to prevent the chattering of the burnishing-iron; and also in certain improvements in the jacking devices.

Figure 1:
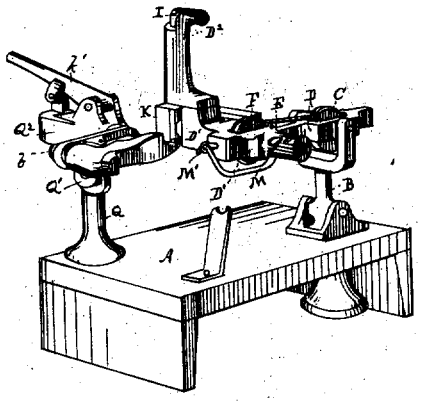
Figure 2:
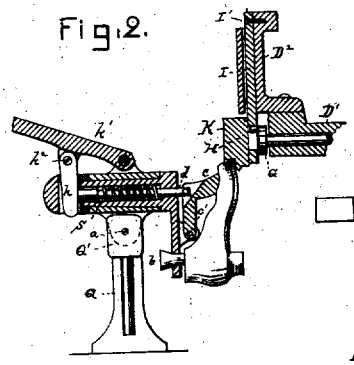
Figure 3:
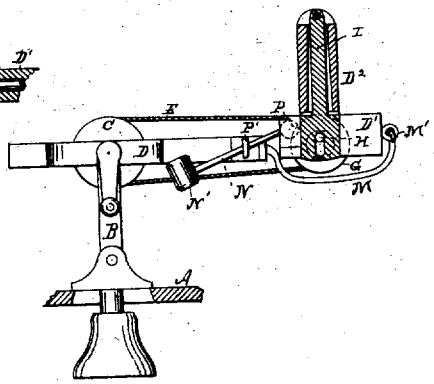

Referring to the drawings, Figure 1 is a perspective view of my invention. Fig. 2 is a vertical section through the jack. Fig. 3 is a vertical section through the device for operating the burnishing-iron, and an elevation of the movable frame which holds the burnishing device.

The tool-carrying frame $D^1$ is hung to the supporting-frame D by means of the hook or eye connections M M′, so that the part $D^1$ can be turned by the handle $D^2$ to any desired position, that the operator may hold the burnishing-iron K so as to work upon any part of the edge of the boot or shoe. The connection M M′ permits the movement of the tool-carrying frame radially and axially in all directions with reference to the frame D.

The swinging upright B, pivoted to the table A, holds the movable supporting-frame D and the axis of the pulley C, driven continuously in one direction, so that the belt E, extended from such pulley to the pulley F on the shaft $g^2$ of the tool-carrying frame $D^1$, may drive such shaft continuously in one direction for all positions of the frames D $D^1$, they being so constructed and connected as to be free to be moved by the hand of the operator into any desired position.

The shaft $g^2$, to which is secured the pulley F, drives a crank-disk, G, having a crank-pin, H, which acts in a slot made at the lower end of a link, I, pivoted at I′ to the upper part of the standard and handle $D^2$, it forming part of the frame $D^1$, and causes the same to rapidly reciprocate or vibrate about its center of motion I′, and reciprocate with it the edge or burnishing-iron K, which may have one or more working-faces for convenience in burnishing different parts of the boot or shoe.

The connected frames D $D^1$ are made longitudinally and vertically movable, to follow the boot or shoe edge to be burnished as the tool K is reciprocated, the upright then turning upon its pivoted center, and the frame D about the axis of the pulley C.

To prevent the part $D^1$ of the movable frame from receiving a tremulous or chattering motion from the rapid vibrations of the burnishing-iron K, I affix to it the weighted lever N N′ by a ball-and-socket joint, P, Fig. 3. This lever passes through an eye-piece, P′, in the part D′ of the frame D, and by its inertia prevents the tremulous action that would otherwise ensue. This device adds greatly to the utility of the machine, as it prevents the chattering which would spoil the edge of the sole, and also almost paralyze the hand of the operator.

The jack for holding the shoe consists of the standard Q, Figs. 1 and 2, the swivel $Q^1$, and the head $Q^2$, which has a motion on the pin *a*, Fig. 2.

The ankle part of the shoe is held by the pin *b*, Fig. 2, which enters the last in the usual manner. The toe part is held by the support *c*, which is pivoted at *c′*, and operated by the bar or rod $d$ and spring S. The bar or rod $d$ is pushed forward by the wedge $k$. The wedge $k$ is operated by the lever-handle $k^1$, to which it is connected by the pin $k^2$.

In burnishing-machines it is essential that the movements of the various devices which actuate the burnishing-tools operate with the least possible jar, and that such devices operate as rapidly and quietly as possible, high speed being essential in the production of good work, and therefore in this machine, instead of reciprocating the burnishing-tool by means of a reciprocating rack and pinions, and instead of moving such pinion through rotary reciprocating shafts and racks and pinions, as heretofore common, I have arranged to reciprocate the burnishing-tool through a link-and-crank connection, and all the shafts which cooperate to move the burnishing-tool are driven continuously in but one direction, which adds materially to the value of the machine and the convenience of using it, for it can be run at the highest rate of speed in the most quiet manner and with the least waste of power.

I claim—

1. In an organized burnishing-machine, the following instrumentalities, viz., a reciprocating burnishing-tool, a shaft rotated in but one direction to operate said tool, a universally-jointed tool-carrying frame, a handle thereon to hold and move it, and a horizontally-movable frame, and a shaft rotated in but one direction, and supported in bearings in said frame, said latter frame and shaft being adapted to be reciprocated together in the direction of the length of the shoe, and at the same time move with it the tool-carrying frame, and rotating the shaft of said frame continuously in but one direction to reciprocate the burnishing-tool, substantially as described.

2. A universally-jointed tool-carrying frame, provided with a handle to hold and direct it, combined with a shaft rotated in but one direction, a crank-pin thereon, and a link moved by such crank-pin to reciprocate the burnishing-iron.

3. The combination of the iron K, movable frame B, the part $D^1$, the handle $D^2$, and the vibrating link I, all operating together substantially as described, and for the purpose set forth.

4. The combination of vibrating iron K and the frame $D^1$ with the weighted lever N N′, connected with the frame, and arranged, as described, to prevent tremulous motion, substantially as described.

5. In the holding-jack, the combination of the support Q and the bar or rod $d$ with the wedge $k$ and lever $k^1$, all operating substantially as described, and for the purpose set forth.

CHARLES J. ADDY.

Witnesses:
G. W. GREGORY,
L. A. BAXTER.